US011455255B1

(12) United States Patent
Jain et al.

(10) Patent No.: US 11,455,255 B1
(45) Date of Patent: Sep. 27, 2022

(54) READ PERFORMANCE OF LOG-STRUCTURED FILE SYSTEM (LFS)-BASED STORAGE SYSTEMS THAT SUPPORT COPY-ON-WRITE (COW) SNAPSHOTTING

(71) Applicant: VMware, Inc., Palo Alto, CA (US)

(72) Inventors: Abhay Kumar Jain, Cupertino, CA (US); Sriram Patil, San Jose, CA (US); Wenguang Wang, Santa Clara, CA (US); Enning Xiang, San Jose, CA (US); Asit A. Desai, San Ramon, CA (US)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 17/328,281

(22) Filed: May 24, 2021

(51) Int. Cl.
    *G06F 12/00*      (2006.01)
    *G06F 12/10*      (2016.01)
    *G06F 16/17*      (2019.01)
    *G06F 16/11*      (2019.01)

(52) U.S. Cl.
CPC ............ *G06F 12/10* (2013.01); *G06F 16/128* (2019.01); *G06F 16/1727* (2019.01); *G06F 2212/1016* (2013.01); *G06F 2212/163* (2013.01)

(58) Field of Classification Search
CPC .... G06F 12/10; G06F 16/1727; G06F 16/128; G06F 2212/1016; G06F 2212/163
See application file for complete search history.

(56) References Cited

U.S. PATENT DOCUMENTS

2019/0108100 A1\*   4/2019   Lyakas ................. G06F 3/0674
2020/0065400 A1\*   2/2020   Desai .................... G06F 16/128

\* cited by examiner

*Primary Examiner* — Gurtej Bansal

(57) ABSTRACT

Techniques for improving the read performance of an LFS-based storage system that supports COW snapshotting are provided. In one set of embodiments, the storage system can implement an intermediate map for each storage object in the system that is keyed by a composite key consisting of snapshot identifier (major key) and LBA (minor key). With this approach, contiguous logical block addresses (LBAs) of a storage object or its snapshots will map to contiguous <Snapshot ID, LBA>-to-PBA mappings in the storage object's intermediate map, resulting in good spatial locality for those LBAs and robust read performance.

21 Claims, 7 Drawing Sheets

READ PERFORMANCE OF LOG-STRUCTURED FILE SYSTEM (LFS)-BASED STORAGE SYSTEMS THAT SUPPORT COPY-ON-WRITE (COW) SNAPSHOTTING

BACKGROUND

Unless otherwise indicated, the subject matter described in this section is not prior art to the claims of the present application and is not admitted as being prior art by inclusion in this section.

A log-structured file system (LFS) is a type of file system that writes data to physical storage sequentially in the form of an append-only log rather than performing in-place overwrites. This improves write performance by allowing small write requests to be batched into large sequential writes, but requires a segment cleaner that periodically identifies under-utilized segments on physical storage (i.e., segments with a large percentage of "dead" data blocks that have been superseded by newer versions) and reclaims the under-utilized segments by compacting their remaining live data blocks into other, empty segments.

Snapshotting is a storage feature that allows for the creation of snapshots, which are point-in-time read-only copies of storage objects such as files. Snapshots are commonly used for data backup, archival, and protection (e.g., crash recovery) purposes. Copy-on-write (COW) snapshotting is an efficient snapshotting implementation that generally involves (1) maintaining, for each storage object, a B+ tree (referred to as a "logical map") that keeps track of the storage object's state in the form of [logical block address (LBA)→physical block address (PBA)] key-value pairs (i.e., LBA-to-PBA mappings), and (2) at the time of taking a snapshot of the storage object, making the storage object's logical map immutable/read-only, designating this immutable logical map as the logical map of the snapshot, and creating a new logical map for the current (i.e., live) version of the storage object that includes a single root node pointing to the first level tree nodes of the snapshot's logical map (which allows the two logical maps to share the same LBA-to-PBA mappings).

If a write is subsequently made to the storage object that results in a change to a particular LBA-to-PBA mapping, a copy of the leaf node in the snapshot's logical map that holds the affected mapping—as well as copies of any internal tree nodes between the leaf node and the root node—are created, and the storage object's logical map is updated to point to the newly-created node copies, thereby separating it from the snapshot's logical map along that particular tree branch. The foregoing steps are then repeated as needed for further snapshots of, and modifications to, the storage object.

One challenge with implementing COW snapshotting in an LFS-based storage system is that the LFS segment cleaner may occasionally need to move on disk the logical data blocks of one or more snapshots in order to reclaim under-utilized segments. This is problematic because snapshot logical maps are immutable once created; accordingly, the LFS segment cleaner cannot directly change the LBA-to-PBA mappings of the affected snapshots to reflect the new storage locations of their data blocks.

It is possible to overcome this issue by replacing the logical map of a storage object and its snapshots with two separate B+ trees: a first B+ tree, also referred to as a "logical map," that includes LBA-to-virtual block address (VBA) mappings (i.e., [LBA→VBA] key-value pairs), and a second B+ tree, referred to as an "intermediate map," that includes VBA-to-PBA mappings (i.e., [VBA→PBA] key-value pairs). In this context, a VBA is a monotonically increasing number that is incremented each time a new PBA is allocated and written for a given storage object, such as at the time of processing a write request directed to that object. With this approach, the LFS segment cleaner can change the PBA to which a particular LBA is mapped by modifying the VBA-to-PBA mapping in the intermediate map without touching the corresponding LBA-to-VBA mapping in the logical map, thereby enabling it to successfully update the logical to physical mappings of COW snapshots.

However, the use of VBA as the key for the intermediate map raises its own set of problems with respect to read performance. For example, consider a scenario in which the clients of a given storage object issue mostly random writes to that object. In this scenario, the VBAs for the storage object will be incremented sequentially in accordance with the incoming write requests, but the LBAs associated with the VBAs will be random in nature because the write request themselves are directed to random LBAs. As a result, the LBAs of the storage object will have poor spatial locality in its intermediate map (or in other words, contiguous LBAs of the storage object will generally map to non-contiguous [VBA→PBA] key-value pairs in the intermediate map). This, in turn, means that a sequential read directed to n contiguous LBAs of the storage object (or a snapshot thereof) may require the retrieval of up to n leaf nodes in the intermediate map to resolve the PBAs mapped to those LBAs, which significantly increases the I/O overhead and latency of the read operation.

DETAILED DESCRIPTION

In the following description, for purposes of explanation, numerous examples and details are set forth in order to provide an understanding of various embodiments. It will be evident, however, to one skilled in the art that certain embodiments can be practiced without some of these details or can be practiced with modifications or equivalents thereof.

1. Overview

The present disclosure is directed to techniques for improving the read performance of an LFS-based storage system that supports COW snapshotting. At a high level, these techniques involve implementing an intermediate map for each storage object in the system that is keyed by a composite key consisting of snapshot identifier (ID) and LBA, rather than by single element key consisting of a monotonically increasing VBA. In the composite key, snapshot ID is the major key and LBA is a minor key.

With this approach, contiguous LBAs in the logical address space of a storage object or its snapshots will map to contiguous <Snapshot ID, LBA>-to-PBA mappings (i.e., [<Snapshot ID, LBA>→PBA] key-value pairs) in the storage object's intermediate map, resulting in good spatial locality for those LBAs and thus robust read performance. This will be true regardless of the type of write workloads issued to the storage object (e.g., random, sequential, or mixed).

Further, because the intermediate map remains separate from the logical maps of the storage object and its snapshots, the LFS segment cleaner of the storage system can freely change the logical to physical mappings of a snapshot by modifying the intermediate map, without touching the snapshot's immutable logical map. Accordingly, this approach retains all of the benefits provided by a log-structured file system. The foregoing and other aspects of the present disclosure are described in further detail below.

2. Example LFS-Based Storage System

Figure 1:
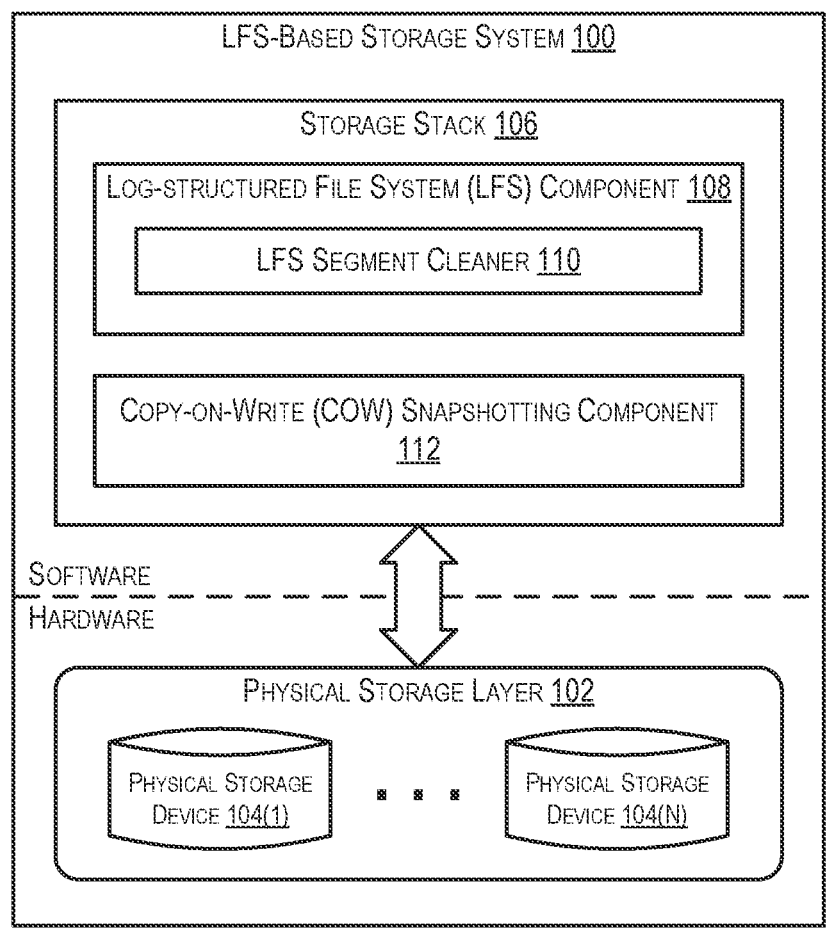
FIG. 1 depicts an example LFS-based storage system according to certain embodiments.

FIG. 1 is a simplified block diagram of an LFS-based storage system 100 in which embodiments of the present disclosure may be implemented. As shown, storage system 100 includes, in hardware, a physical storage layer 102 comprising a number of physical storage devices 104(1)-(N) (e.g., magnetic disks, solid state disks (SSDs), non-volatile memory (NVM) modules, etc.). Storage system 100 also includes, in software, a storage stack 106 comprising a log-structured file system (LFS) component 108 (with an LFS segment cleaner 110) and a copy-on-write (COW) snapshotting component 112.

LFS component 108 is configured to manage the storage of data in physical storage layer 102 and write data modifications to layer 102 in a sequential, append-only log format. This means that logical data blocks are never overwritten in place on disk; instead, each time a write request is received for a logical data block, a new physical data block is allocated on physical storage layer 102 and written with the latest version of the logical data block's content. By avoiding in-place overwrites, LFS component 108 can advantageously accumulate multiple small write requests directed to different LBAs of a storage object in an in-memory buffer and, once the buffer is full, write out all of the accumulated write data (collectively referred to as a "segment") via a single, sequential write operation. This is particularly useful in scenarios where storage system 100 implements RAID-5/6 erasure coding across physical storage layer 102 because it enables the writing of data as full RAID-5/6 stripes and thus eliminates the performance penalty of partial stripe writes.

To ensure that physical storage layer 102 has sufficient free space for writing new segments, LFS segment cleaner 110 periodically identifies existing segments on disk that have become under-utilized due to the creation of new, superseding versions of the logical data blocks in those segments. The superseded data blocks are referred to as dead data blocks. LFS segment cleaner 110 then reclaims the under-utilized segments by copying their remaining non-dead (i.e., live) data blocks in a compacted form into one or more empty segments, which allows the under-utilized segments to be deleted and reused.

COW snapshotting component 112 of storage stack 106 is configured to create snapshots of the storage objects maintained in storage system 100 by manipulating, via a copy-on-write mechanism, B+ trees (i.e., logical maps) that keep track of the storage objects' states. To explain the general operation of COW snapshotting component 112, FIGS. 2A, 2B, 2C, and 2D depict the logical map of an example storage object O and how this logical map changes (and how snapshot logical maps are created) as O is modified and snapshotted. These figures assume that the schema of the logical map for storage object O is [Key: LBA→Value: PBA], which is different from the embodiments of the present disclosure but sets the stage/context for those embodiments. These figures also assume, for purposes of illustration, that the maximum number of key-value pairs (i.e., mappings) that can be held at each logical map leaf node is three. In practice, each leaf node may hold significantly more key-value pairs (e.g., on the order of hundreds or thousands).

Figure 2A:
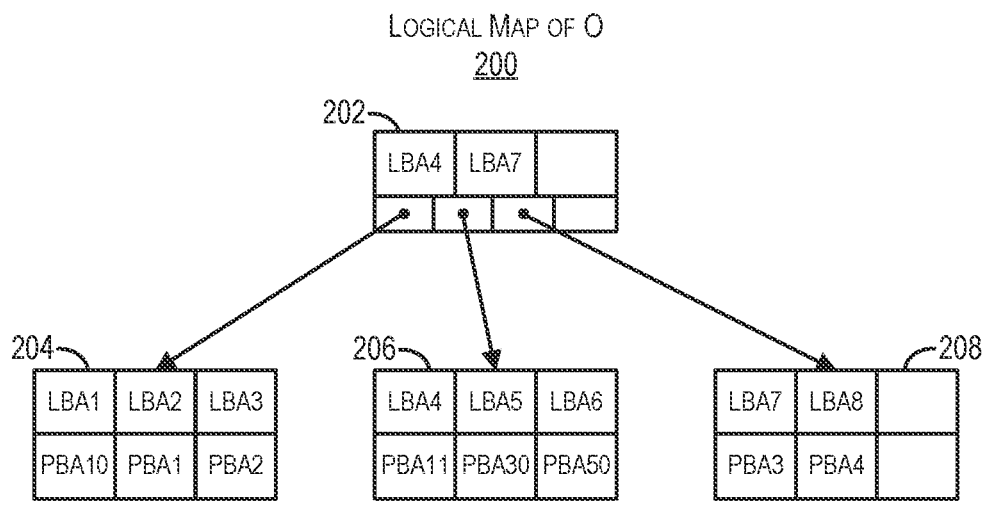
FIGS. 2A, 2B, 2C, and 2D illustrate the effects of COW snapshotting on the logical map of an example storage object.

Starting with FIG. 2A, this figure depicts an initial state of a logical map 200 of storage object O that comprises a root node 202 with keys LBA4 and LBA7 and pointers to three leaf nodes 204, 206, and 208. Leaf node 204 includes LBA-to-PBA mappings for LBA1-LBA3 of O (i.e., [LBA1→PBA10], [LBA2→PBA1], and [LBA3→PBA2]), leaf node 206 includes LBA-to-PBA mappings for LBA4-LBA6 of O (i.e., [LBA4→PBA11], [LBA5→PBA30], and [LBA6→PBA50]), and leaf node 208 includes LBA-to-PBA mappings for LBA7 and LBA8 of O (i.e., [LBA7→PBA3] and [LBA8→PBA4]).

Figure 2B:
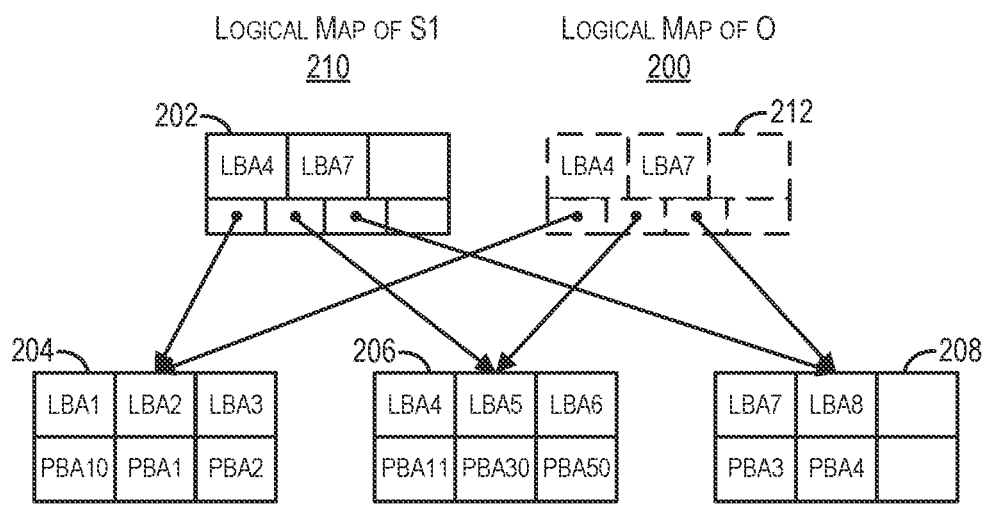

FIG. 2B depicts the outcome of taking a snapshot S1 of storage object O at the point in time shown in FIG. 2A. Per FIG. 2B, tree nodes 202-208—which were previously part of logical map 200 of storage object O—are now designated as being part of a logical map of snapshot S1 (reference numeral 210) and made immutable/read-only. In addition, a new root node 212 is created that includes the same keys and pointers as root node 202 and is designated as the root node of logical map 200 of storage object O. This enables the logical map of the current (i.e., live) version of storage object O to share the same leaf nodes (and thus same LBA-to-PBA mappings) as the logical map of snapshot S1, because they are currently identical. Node 212, which is "owned" by (i.e., part of the logical map of) live storage object O, is illustrated with dashed lines to differentiate it from nodes 202-208, which are now owned by snapshot S1.

Figure 2C:
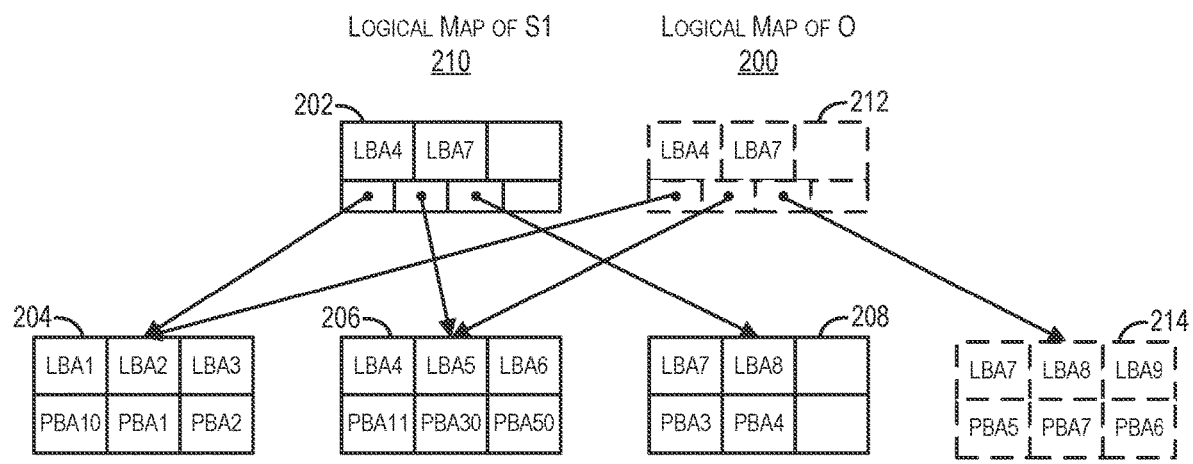

FIG. 2C depicts the outcome of receiving, after the creation of snapshot S1, writes to storage object O that result in the following new LBA-to-PBA mappings: [LBA7→PBA5], [LBA8→PBA7], and [LBA9→PBA6]. As shown in FIG. 2C, a copy 214 of leaf node 208 is created (because leaf node 208 contains prior mappings for LBA7-LBA9) and this copy is updated to include the new mappings noted above. In addition, root node 212 of logical map 200 of storage object O is modified to point to copy 214 rather than to original node 208, thereby updating O's logical map to include this new information.

Figure 2D:
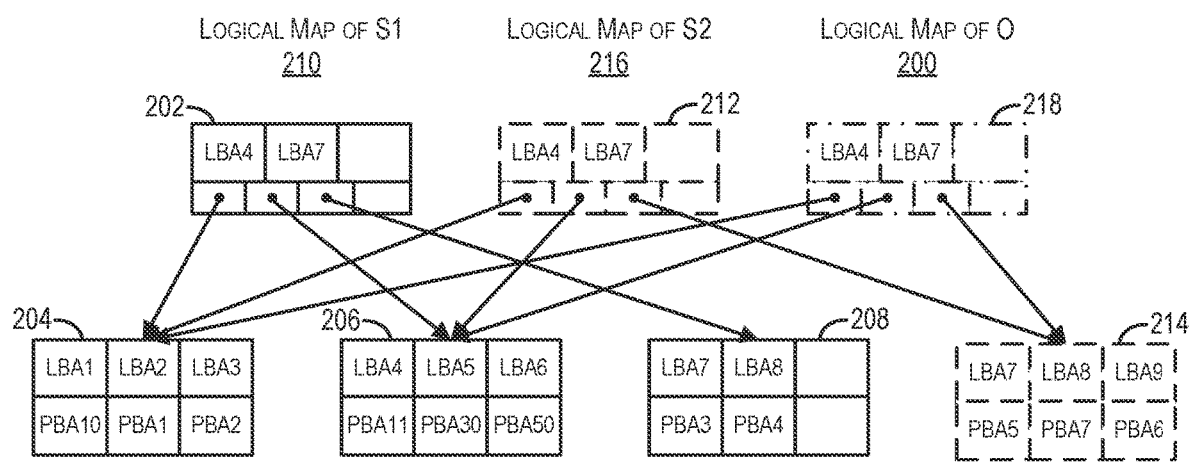

Finally, FIG. 2D depicts the outcome of taking another snapshot S2 of storage object O at the point in time shown in FIG. 2C. Per FIG. 2D, tree nodes 212 and 214—which were previously part of logical map 200 of storage object O—are now designated as being part of a logical map of snapshot S2 (reference numeral 216) and made immutable/read-only. In addition, a new root node 218 is created that includes the same keys and pointers as root node 212 and is designated as the root node of logical map 200 of storage object O. Node 218, which is owned by live storage object O, is illustrated with alternating dashed and dotted lines to differentiate it from nodes 212 and 214, which are now owned by snapshot S2. The general sequence of events shown in FIGS. 2A-2D can be repeated as further snapshots of, and modifications to, storage object O are taken/received, resulting in a continually expanding set of interconnected logical maps for O and its snapshots that capture the incremental changes made to O during each snapshot interval.

As noted in the Background section, LFS segment cleaner 110 may occasionally need to move the logical data blocks of one or more snapshots across physical storage layer 102 as part of its segment cleaning duties. For example, if logical data blocks LBA1-LBA3 of snapshot S1 shown in FIGS. 2B-2D reside in a segment SEG1 that is under-utilized, LFS segment cleaner 110 may attempt to move these logical data blocks to another, empty segment so that SEG1 can be reclaimed. However, because the logical maps of COW snapshots are immutable once created, LFS segment cleaner 110 cannot directly modify the mappings in snapshot S1's logical map to carry out this segment reclamation operation.

One solution for this issue is to implement a two-level logical to physical mapping mechanism that comprises a per-object/snapshot logical map with a schema of [Key: LBA→Value: VBA] and a per-object intermediate map with a schema of [Key: VBA→Value: PBA]. The VBA element is a monotonically increasing number that is incremented as new PBAs are allocated and written. This solution introduces a layer of indirection between logical and physical addresses and thus allows LFS segment cleaner 110 to change a PBA by modifying its VBA-to-PBA mapping in the intermediate map, without modifying the corresponding LBA-to-VBA mapping in the logical map.

Figure 3A:
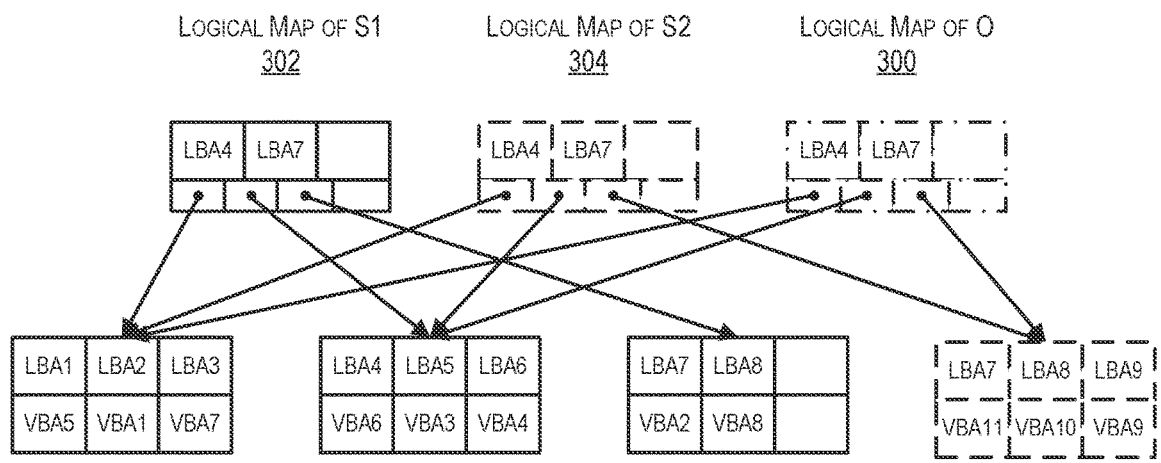
FIGS. 3A and 3B depict the implementation of a two-level logical to physical mapping mechanism with a VBA-based intermediate map for the example storage object of FIGS. 2A-2D.
Figure 3B:
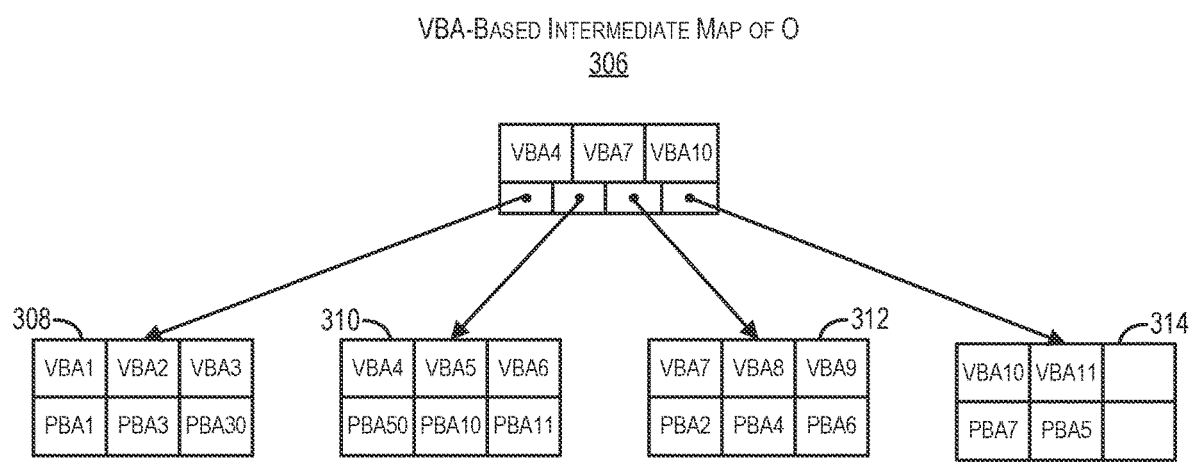

However, the use of a VBA-based intermediate map can, depending on the nature of the write workloads received by storage system 100, lead to suboptimal read performance. To illustrate this, FIG. 3A depicts alternative versions of the logical maps for storage object O and snapshots S1 and S2 from FIG. 2D (i.e., reference numerals 300, 302, and 304) that incorporate LBA-to-VBA mappings per the two-level logical to physical mapping mechanism described above, and FIG. 3B depicts an intermediate map 306 for storage object O that corresponds to logical maps 300, 302, and 304. FIGS. 3A and 3B assume that the writes to storage object O as recorded in these logical/intermediate maps have been mostly random (i.e., directed to random LBAs).

As shown in FIG. 3A, the LBAs in logical maps 300, 302, and 304 correspond to random VBAs due to the random nature of the writes issued to storage object O. In particular, logical map 302 of snapshot S1 contains the following LBA-to-VBA mappings:

[LBA1→VBA5]
[LBA2→VBA1]
[LBA3→VBA7]
[LBA4→VBA6]
[LBA5→VBA3]
[LBA6→VBA4]
[LBA7→VBA2]
[LBA8→VBA8]

And logical map 304 of snapshot S2 contains the following LBA-to-VBA mappings:

[LBA7→VBA11]
[LBA8→VBA10]
[LBA9→VBA9]

The problem with this scenario is that, because of the random correspondence between LBAs and VBAs in logical maps 300, 302, and 304, the LBAs of storage object O have poor spatial locality in intermediate map 306 shown in FIG. 3B, which is keyed and ordered by VBA. Stated another way, contiguous LBAs in the logical address space of storage object O map to mostly non-contiguous [VBA→PBA] key-value pairs (and in many cases, different leaf nodes) in intermediate map 306. For example, LBA1 maps to [VBA5→PBA10] on leaf node 310 of intermediate map 306, LBA2 maps to [VBA1→PBA1] on leaf node 308 of intermediate map 306, and LBA3 maps to [VBA7→PBA2] on leaf node 312 of intermediate map 306.

This means that if storage system 100 receives a read request to sequentially read logical data blocks LBA1-LBA3 of snapshot S1 of storage object O, storage system 100 must load from disk three separate leaf pages 308, 310, and 312 of intermediate map 306 in order to complete the request. As another example, if storage system 100 receives a read request to sequentially read logical data blocks LBA5-LBA7 of snapshot S2 of storage object O, storage system 100 must load from disk three separate leaf pages 308, 310, and 314 of intermediate map 306 in order to complete the request. This translates into an I/O cost per sequential read that is, in the worst case, linear with respect to the number of requested data blocks, which is problematic because large sequential read operations are a common part of many storage management workloads (e.g., analysis, reporting, backup, etc.).

3. Solution Description

To address the foregoing and other similar problems, in certain embodiments storage system 100 of FIG. 1 can implement a two-level logical to physical mapping mechanism that is similar to the one discussed above (i.e., includes a per-object/snapshot logical map and per-object intermediate map), but utilizes the following schemas for the logical map and intermediate map respectively:

[Key: LBA→Value: Snapshot ID]
   Listing 1: Logical Map Schema
[Key: <Snapshot ID, LBA>→Value: PBA]
   Listing 2: Intermediate Map Schema As shown above, the value field of the logical map no longer contains VBA; instead, it contains the identifier of the snapshot that owns the logical map. For live storage objects, this snapshot ID can correspond to a special number that indicates it is a live storage object rather than a snapshot, such as the last snapshot number+1.

Further, the key field of the intermediate map no longer contains VBA; instead, it contains a composite key composed of snapshot ID (the major key) and LBA (a minor key). This type of intermediate map is hereinafter referred to as an "LBA-based intermediate map." In certain embodiments, the value field of the logical and/or intermediate maps can also include other elements that may be useful to storage system 100, such as a "numBlocks" element (which allows key-value pairs for multiple contiguous LBAs, known as a logical extent, to be consolidated into a single key-value pair that spans the number of logical data blocks specified by this element), a "CRC" element (which includes a checksum of the data block content), and so on.

Figure 4:
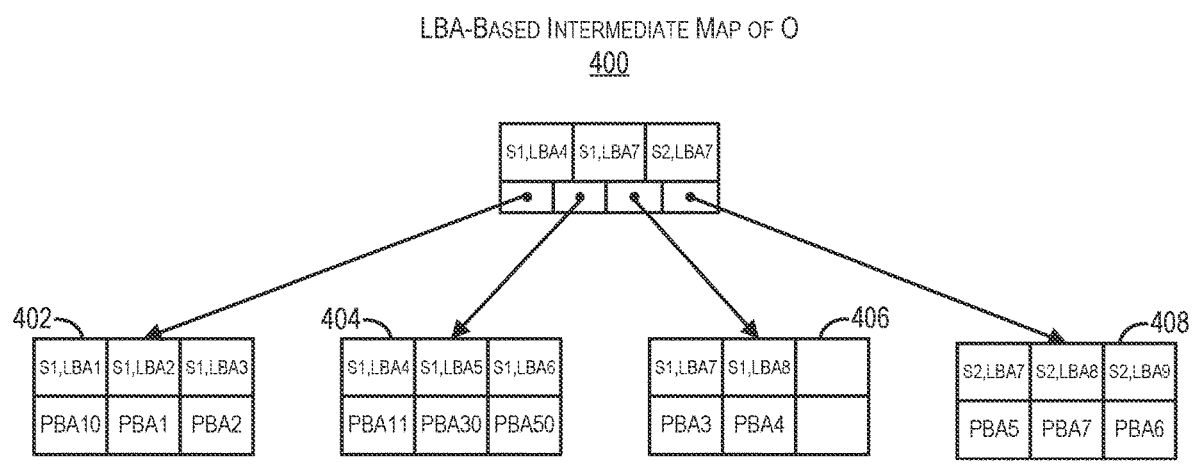
FIG. 4 depicts an LBA-based intermediate map for the example storage object of FIGS. 2A-2D.

With this LBA-based intermediate map approach, the LBAs of a storage object and its snapshots will always exhibit good spatial locality in the storage object's intermediate map, regardless of the type of write workloads issued to the object, because the intermediate map is keyed (and thus ordered) by snapshot ID first and LBA second. For example, FIG. 4 depicts an LBA-based intermediate map 400 for storage object O as of the point in time shown in FIG. 2D. As shown in FIG. 4, the mappings for snapshot S1 of O are held in contiguous LBA order on leaf nodes 402-406 of intermediate map 400. Similarly, the mappings for snapshot S2 of O are held in contiguous LBA order on leaf node 408 of intermediate map 400.

Accordingly, if storage system 100 receives a read request to sequentially read, e.g., LBA1-LBA3 of snapshot S1, the storage system only needs to retrieve a single leaf node of intermediate map 400 (i.e., node 402) from disk in order to identify the PBAs of those LBAs and complete the sequential read operation. This is in contrast to retrieving three separate leaf nodes using VBA-based intermediate map 306 of FIG. 3B. Thus, the LBA-based intermediate map approach of the present disclosure results in significantly improved read performance that is resilient to the patterns of client write workloads. Generally speaking, this approach will incur an I/O cost per sequential read that is constant and thus independent of the number of requested data blocks, because it is highly likely that all of the requested data blocks will correspond to <Snapshot ID, LBA>-to-PBA mappings that are located in one or a few leaf pages of the LBA-based intermediate map.

It should be appreciated that FIGS. 1-4 are illustrative and not intended to limit embodiments of the present disclosure. For example, although storage system 100 of FIG. 1 is depicted as a singular entity, in certain embodiments storage system 100 may be distributed in nature and thus consist of multiple networked storage nodes, each holding a portion of the system's physical storage layer 102. Further, although FIG. 1 depicts a particular arrangement of components within storage system 100, other arrangements are possible (e.g., the functionality attributed to a particular component may be split into multiple components, components may be combined, etc.). One of ordinary skill in the art will recognize other variations, modifications, and alternatives.

4. Populating the Logical and Intermediate Maps

Figure 5:
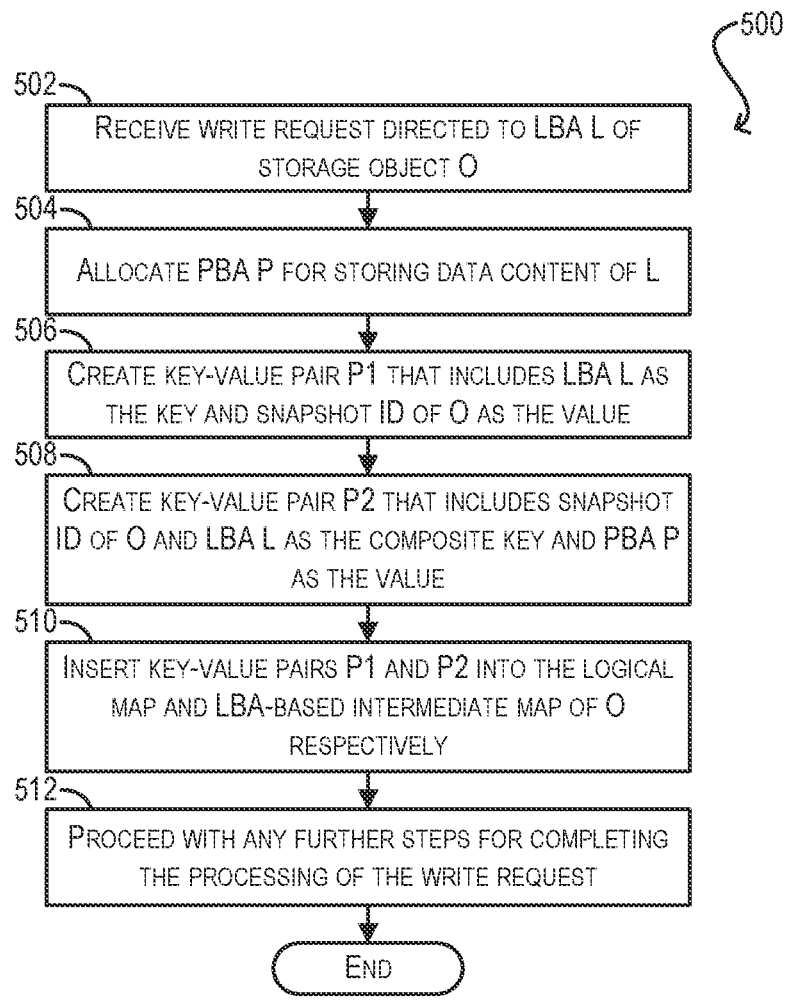
FIG. 5 depicts a workflow for populating the LBA-based intermediate map and corresponding logical map for a storage object according to certain embodiments.

FIG. 5 depicts a workflow 500 that can be executed by storage system 100 of FIG. 1 at the time of receiving a write request directed to a storage object O for populating O's LBA-based intermediate map and corresponding logical map according to certain embodiments.

Starting with steps 502 and 504, storage system 100 can receive a write request directed to an LBA L of storage object O that includes data content to be written to L and can allocate a new PBA P on physical storage layer 102 (or in an in-memory segment buffer) for holding the specified data content.

At step 506, storage system 100 can create a first key-value pair P1 that includes LBA L as the key and the snapshot ID of storage object O as the value. As mentioned previously, for a live storage object, the object's snapshot ID can correspond to a special number such as the last snapshot number of the object+1.

In addition, at step 508, storage system 100 can create a second key-value pair P2 that includes storage object O's snapshot ID and LBA L as a composite key and PBA P as the value.

Finally, at steps 510 and 512, storage system 100 can insert key-value pairs P1 and P2 into the logical map and the LBA-based intermediate map of storage object O respectively and proceed with any further steps need to complete its processing of the write request.

5. Read Workflow

Figure 6:
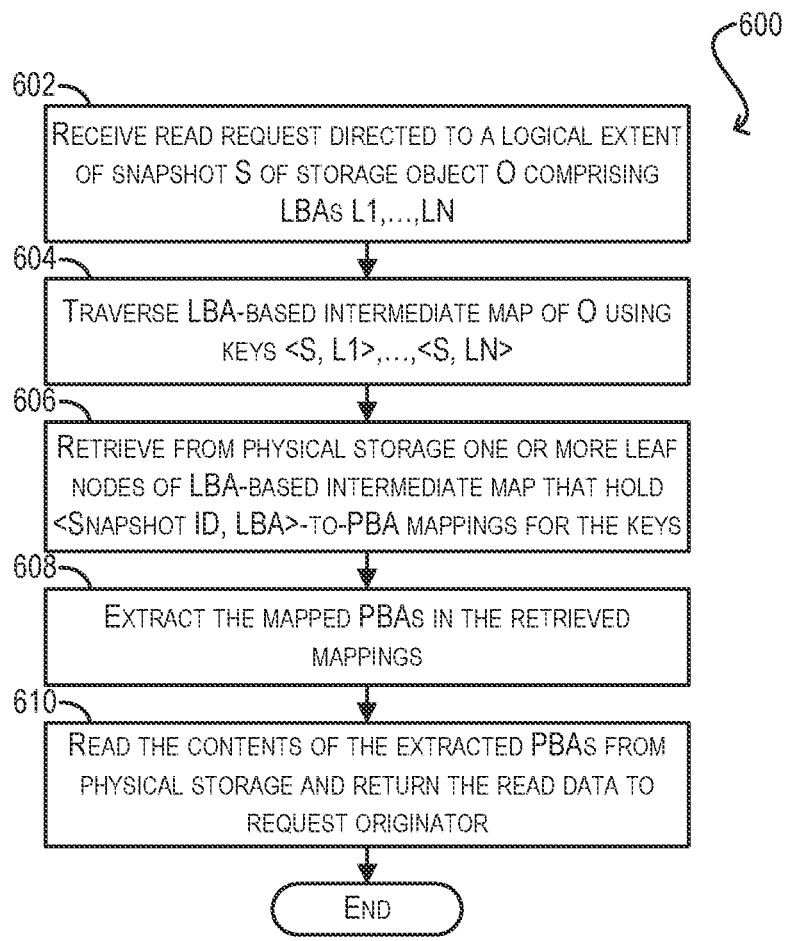
FIG. 6 depicts a workflow for processing a read request directed to a snapshot of the storage object of FIG. 5 according to certain embodiments.

FIG. 6 depicts a workflow 600 that can be executed by storage system 100 of FIG. 1 for processing a read request directed to a set of contiguous LBAs (i.e., a logical extent) of a snapshot S of storage object O according to certain embodiments. Workflow 600 assumes that snapshot S is associated with a logical map and storage object O is associated with an LBA-based intermediate map that have been populated in accordance with workflow 500 of FIG. 5.

Starting with step 602, storage system 100 can receive a read request for a logical extent of snapshot S of storage object O comprising LBAs L1, . . . , LN. In response, storage system 100 can traverse the LBA-based intermediate map of storage object O using keys <S, L1>, . . . , <S, LN> (step 604) and retrieve, from physical storage layer 102, one or more leaf nodes of the LBA-based intermediate map that hold <Snapshot ID, LBA>-to-PBA mappings (i.e., key-value pairs) corresponding to these keys (step 606). Because the mappings in the LBA-based intermediate map are ordered by snapshot ID and LBA, step 606 will generally result in the retrieval of a small number of leaf nodes.

At step 608, storage system 100 can extract the mapped PBAs in the retrieved intermediate map leaf nodes. Finally, at step 610, storage system 100 can read the contents of the extracted PBAs from physical storage layer 102 and return the read data to the request originator.

Certain embodiments described herein can employ various computer-implemented operations involving data stored in computer systems. For example, these operations can require physical manipulation of physical quantities—usually, though not necessarily, these quantities take the form of electrical or magnetic signals, where they (or representations of them) are capable of being stored, transferred, combined, compared, or otherwise manipulated. Such manipulations are often referred to in terms such as producing, identifying, determining, comparing, etc. Any operations described herein that form part of one or more embodiments can be useful machine operations.

Further, one or more embodiments can relate to a device or an apparatus for performing the foregoing operations. The apparatus can be specially constructed for specific required purposes, or it can be a generic computer system comprising one or more general purpose processors (e.g., Intel or AMD x86 processors) selectively activated or configured by program code stored in the computer system. In particular, various generic computer systems may be used with computer programs written in accordance with the teachings herein, or it may be more convenient to construct a more specialized apparatus to perform the required operations. The various embodiments described herein can be practiced with other computer system configurations including handheld devices, microprocessor systems, microprocessor-based or programmable consumer electronics, minicomputers, mainframe computers, and the like.

Yet further, one or more embodiments can be implemented as one or more computer programs or as one or more computer program modules embodied in one or more non-transitory computer readable storage media. The term non-transitory computer readable storage medium refers to any storage device, based on any existing or subsequently developed technology, that can store data and/or computer programs in a non-transitory state for access by a computer system. Examples of non-transitory computer readable media include a hard drive, network attached storage (NAS), read-only memory, random-access memory, flash-based nonvolatile memory (e.g., a flash memory card or a solid state disk), persistent memory, NVMe device, a CD (Compact Disc) (e.g., CD-ROM, CD-R, CD-RW, etc.), a DVD (Digital Versatile Disc), a magnetic tape, and other optical and non-optical data storage devices. The non-transitory computer readable media can also be distributed over a network coupled computer system so that the computer readable code is stored and executed in a distributed fashion.

Finally, boundaries between various components, operations, and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations can be implemented as a combined structure or component. Similarly, structures and functionality presented as a single component can be implemented as separate components.

As used in the description herein and throughout the claims that follow, "a," "an," and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. These examples and embodiments should not be deemed to be the only embodiments and are presented to illustrate the flexibility and advantages of particular embodiments as defined by the following claims. Other arrangements, embodiments, implementations and equivalents can be employed without departing from the scope hereof as defined by the claims.

What is claimed is:

1. A method comprising:
   receiving, by a storage system, a write request directed to a logical block address (LBA) of a storage object maintained on the storage system, the write request including data content for the LBA;
   allocating, by the storage system, a physical block address (PBA) for holding the data content;
   creating, by the storage system, a first key-value pair that includes the LBA as a key of the first key-value pair and a snapshot identifier of the storage object as a value of the first key-value pair;
   creating, by the storage system, a second key-value pair that includes the snapshot identifier and the LBA as a composite key of the second key-value pair and the PBA as a value of the second key-value pair;
   inserting, by the storage system, the first key-value pair into a first tree metadata structure associated with the storage object; and
   inserting, by the storage system, the second key-value pair into a second tree metadata structure associated with the storage object.

2. The method of claim 1 wherein the snapshot ID is a major key of the composite key and wherein the LBA is a minor key of the composite key.

3. The method of claim 1 further comprising:
   taking a copy-on-write (COW) snapshot of the storage object by:
      rendering the first tree metadata structure immutable;
      designating the first tree metadata structure as belonging to the COW snapshot;
      creating a root tree node for a third tree metadata structure associated with the storage object; and
      causing the root tree to point to first level tree nodes of the first tree metadata structure.

4. The method of claim 3 further comprising:
   determining that the data content for the LBA should be moved from the PBA to a new PBA; and
   updating the second key-value pair in the second tree metadata structure to reflect the new PBA.

5. The method of claim 1 wherein the snapshot identifier of the storage object corresponds to a most recent snapshot number for the storage object+1.

6. The method of claim 1 wherein the second tree metadata structure is a B+ tree that records <snapshot identifier, LBA>-to-PBA key-value pairs for the storage object and all snapshots of the storage object.

7. The method of claim 1 further comprising:
   receiving a read request directed to a set of contiguous LBAs for the storage object;
   traversing the second tree metadata structure based on the snapshot identifier of the storage object and the set of contiguous LBAs;
   retrieving a single leaf node of the second tree metadata structure in response to the traversing, the single leaf node including a set of <snapshot identifier, LBA>-to-PBA key-value pairs for the set of contiguous LBAs;
   extracting the PBAs in the set of <snapshot identifier, LBA>-to-PBA key-value pairs; and
   reading contents of the PBAs from a physical storage of the storage system.

8. A non-transitory computer readable storage medium having stored thereon program code executable by a storage system, the program code embodying a method comprising:
   receiving a write request directed to a logical block address (LBA) of a storage object maintained on the storage system, the write request including data content for the LBA;
   allocating a physical block address (PBA) for holding the data content;
   creating a first key-value pair that includes the LBA as a key of the first key-value pair and a snapshot identifier of the storage object as a value of the first key-value pair;
   creating a second key-value pair that includes the snapshot identifier and the LBA as a composite key of the second key-value pair and the PBA as a value of the second key-value pair;
   inserting the first key-value pair into a first tree metadata structure associated with the storage object; and
   inserting the second key-value pair into a second tree metadata structure associated with the storage object.

9. The non-transitory computer readable storage medium of claim 8 wherein the snapshot ID is a major key of the composite key and wherein the LBA is a minor key of the composite key.

10. The non-transitory computer readable storage medium of claim 8 wherein the method further comprises:
    taking a copy-on-write (COW) snapshot of the storage object by:
       rendering the first tree metadata structure immutable;
       designating the first tree metadata structure as belonging to the COW snapshot;
       creating a root tree node for a third tree metadata structure associated with the storage object; and
       causing the root tree to point to first level tree nodes of the first tree metadata structure.

11. The non-transitory computer readable storage medium of claim 8 wherein the method further comprises:
    determining that the data content for the LBA should be moved from the PBA to a new PBA; and
    updating the second key-value pair in the second tree metadata structure to reflect the new PBA.

12. The non-transitory computer readable storage medium of claim 8 wherein the snapshot identifier of the storage object corresponds to a most recent snapshot number for the storage object+1.

13. The non-transitory computer readable storage medium of claim 8 wherein the second tree metadata structure is a B+ tree that records <snapshot identifier, LBA>-to-PBA key-value pairs for the storage object and all snapshots of the storage object.

14. The non-transitory computer readable storage medium of claim 8 wherein the method further comprises:
receiving a read request directed to a set of contiguous LBAs for the storage object;
traversing the second tree metadata structure based on the snapshot identifier of the storage object and the set of contiguous LBAs;
retrieving a single leaf node of the second tree metadata structure in response to the traversing, the single leaf node including a set of <snapshot identifier, LBA>-to-PBA key-value pairs for the set of contiguous LBAs;
extracting the PBAs in the set of <snapshot identifier, LBA>-to-PBA key-value pairs; and
reading contents of the PBAs from a physical storage of the storage system.

15. A storage system comprising:
a processor; and
a non-transitory computer readable medium having stored thereon program code that, when executed, causes the processor to:
receive a write request directed to a logical block address (LBA) of a storage object maintained on the storage system, the write request including data content for the LBA;
allocate a physical block address (PBA) for holding the data content;
create a first key-value pair that includes the LBA as a key of the first key-value pair and a snapshot identifier of the storage object as a value of the first key-value pair;
create a second key-value pair that includes the snapshot identifier and the LBA as a composite key of the second key-value pair and the PBA as a value of the second key-value pair;
insert the first key-value pair into a first tree metadata structure associated with the storage object; and
insert the second key-value pair into a second tree metadata structure associated with the storage object.

16. The storage system of claim 15 wherein the snapshot ID is a major key of the composite key and wherein the LBA is a minor key of the composite key.

17. The storage system of claim 15 wherein the program code further causes the processor to:
take a copy-on-write (COW) snapshot of the storage object by:
rendering the first tree metadata structure immutable;
designating the first tree metadata structure as belonging to the COW snapshot;
creating a root tree node for a third tree metadata structure associated with the storage object; and
causing the root tree to point to first level tree nodes of the first tree metadata structure.

18. The storage system of claim 15 wherein the program code further causes the processor to:
determine that the data content for the LBA should be moved from the PBA to a new PBA; and
update the second key-value pair in the second tree metadata structure to reflect the new PBA.

19. The storage system of claim 15 wherein the snapshot identifier of the storage object corresponds to a most recent snapshot number for the storage object+1.

20. The storage system of claim 15 wherein the second tree metadata structure is a B+ tree that records <snapshot identifier, LBA>-to-PBA key-value pairs for the storage object and all snapshots of the storage object.

21. The storage system of claim 15 wherein the program code further causes the processor to:
receive a read request directed to a set of contiguous LBAs for the storage object;
traverse the second tree metadata structure based on the snapshot identifier of the storage object and the set of contiguous LBAs;
retrieve a single leaf node of the second tree metadata structure in response to the traversing, the single leaf node including a set of <snapshot identifier, LBA>-to-PBA key-value pairs for the set of contiguous LBAs;
extract the PBAs in the set of <snapshot identifier, LBA>-to-PBA key-value pairs; and
read contents of the PBAs from a physical storage of the storage system.

* * * * *